(12) United States Patent
Adachi et al.

(10) Patent No.: US 8,068,940 B2
(45) Date of Patent: Nov. 29, 2011

(54) METHOD AND APPARATUS FOR CONTROLLING HEAT GENERATION

(75) Inventors: Kenichi Adachi, Tokyo (JP); Tetsuji Tamura, Tokyo (JP); Iwao Takiguchi, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 373 days.

(21) Appl. No.: 12/067,315

(22) PCT Filed: Jul. 20, 2006

(86) PCT No.: PCT/JP2006/314385
§ 371 (c)(1),
(2), (4) Date: Apr. 25, 2008

(87) PCT Pub. No.: WO2007/043231
PCT Pub. Date: Apr. 19, 2007

(65) Prior Publication Data
US 2009/0292404 A1   Nov. 26, 2009

(30) Foreign Application Priority Data
Oct. 14, 2005   (JP) ................................ 2005-300507

(51) Int. Cl.
*G05D 23/00* (2006.01)
*G06F 1/00* (2006.01)
*G06F 9/46* (2006.01)

(52) U.S. Cl. .................. 700/299; 718/103; 713/300

(58) Field of Classification Search ............. 700/299, 700/300; 718/103, 104; 7/299, 300; 713/300, 713/320, 322
See application file for complete search history.

(56) References Cited

U.S. PATENT DOCUMENTS

| 6,336,080 | B1 * | 1/2002 | Atkinson | 702/132 |
| 6,823,516 | B1 * | 11/2004 | Cooper | 718/108 |
| 6,934,658 | B2 | 8/2005 | Clabes | |

(Continued)

FOREIGN PATENT DOCUMENTS

JP   2000298782 A   10/2000

(Continued)

OTHER PUBLICATIONS

Logical Partitions (LPAR), www.ibm.com/eServer/iSeries/Oper_Nav, 2001.*

(Continued)

*Primary Examiner* — Albert Decady
*Assistant Examiner* — Darrin Dunn
(74) *Attorney, Agent, or Firm* — Matthew B. Dernier; Gibson & Dernier LLP

(57) ABSTRACT

In a control stack included in a software, a control execution unit allows a receiving unit to receive the temperatures of a main processor and a graphic processor. When it determines based on these temperatures that a thermal error has occurred, the control execution unit allows a type acquisition unit to acquire the type of an application running currently. The control execution unit then performs hardware control processing for adjusting the operation of hardware, and software control processing for changing the operation of an application, so as to control the state of heat generation in the hardware. In the software control processing, the control execution unit acquires, from a reaction table, a control method corresponding to the combination of the part where a thermal error has occurred and the type of the running application, and provides control according to the acquired control method.

14 Claims, 7 Drawing Sheets

U.S. PATENT DOCUMENTS

| | | | |
|---|---|---|---|
| 6,948,082 B2* | 9/2005 | Gschwind et al. | 713/320 |
| 7,095,321 B2* | 8/2006 | Primm et al. | 340/540 |
| 7,148,589 B2* | 12/2006 | Nishigaki et al. | 307/413 |
| 7,194,646 B1* | 3/2007 | Watts, Jr. | 713/322 |
| 7,287,173 B2* | 10/2007 | Hsieh | 713/320 |
| 7,529,947 B2* | 5/2009 | Paver | 713/300 |
| 2004/0193383 A1* | 9/2004 | Clabes et al. | 702/132 |
| 2004/0268159 A1* | 12/2004 | Aasheim et al. | 713/300 |
| 2005/0049729 A1* | 3/2005 | Culbert et al. | 700/50 |
| 2005/0055590 A1* | 3/2005 | Farkas et al. | 713/320 |
| 2005/0166075 A1* | 7/2005 | Hack | 713/320 |
| 2005/0200627 A1* | 9/2005 | Desylva | 345/520 |
| 2005/0268065 A1* | 12/2005 | Awada et al. | 711/173 |
| 2006/0092801 A1* | 5/2006 | Van Der Kall | 369/53.43 |
| 2006/0117164 A1* | 6/2006 | Coxe et al. | 712/15 |
| 2006/0178764 A1* | 8/2006 | Bieswanger et al. | 700/89 |
| 2007/0027580 A1* | 2/2007 | Ligtenberg et al. | 700/300 |
| 2007/0073501 A1* | 3/2007 | Bieswanger et al. | 702/81 |
| 2007/0240003 A1* | 10/2007 | Watts, Jr. | 713/322 |

FOREIGN PATENT DOCUMENTS

JP     2004295883 A     10/2004

OTHER PUBLICATIONS

International Search Report for Corresponding Application PCT/JP2006/314385.

International Preliminary Report on Patentability for Corresponding Application PCT/JP2006/314385.

Written Opinion for Corresponding Application PCT/JP2006/314385.

Office Action for corresponding JP Application 2005-300507, dated Apr. 19, 2011.

Office Action for corresponding JP Application 2005-300507, dated Feb. 22, 2011.

* cited by examiner

FIG.1

| APPLICATION LPAR | PROCESSOR / LEVEL | MAIN PROCESSOR | GRAPHIC PROCESSOR | REMARKS |
|---|---|---|---|---|
| GAME LPAR | LEVEL A | 1 | 1 | 1: SYSTEM SHUTDOWN |
| | LEVEL B | 2 & 11 & 12 | 2 & 11 & 12 | 2: DATA PROTECTION AND SYSTEM SHUTDOWN |
| | LEVEL C | 3 & 11 & 12 | 3 & 11 & 12 | 3: SYSTEM SUSPEND |
| | LEVEL D | 4 & 11 & 12 | 4 & 11 & 12 | 4: DATA PROTECTION AND SYSTEM SUSPEND |
| | LEVEL E | 5 & 11 & 12 | 5 & 11 & 12 | 5: GAME LPAR SHUTDOWN |
| | LEVEL F | 6 & 11 & 12 | 6 & 11 & 12 | 6: DATA PROTECTION AND GAME LPAR SHUTDOWN |
| | LEVEL G | 7 & 11 & 12 | 7 & 11 & 12 | 7: GAME LPAR SUSPEND |
| | LEVEL H | 8 & 11 & 12 | 8 & 11 & 12 | 8: DATA PROTECTION AND GAME LPAR SUSPEND |
| | LEVEL I | 9 | 10 | 9: RESTRAINT OF MAIN PROCESSOR OPERATION |
| | ... | ... | ... | 10: RESTRAINT OF GRAPHIC PROCESSOR OPERATION |
| PVR LPAR | | | | 11: DISPLAY OF WARNING MESSAGE |
| | | | | 12: LOG RECORDING |

FIG.4

| PROCESSOR | APPLICATION TYPE | REACTION |
|---|---|---|
| MAIN PROCESSOR | GAME | GAME SILENT MODE →GAME LOW-RESOLUTION MODE→GAME SUSPEND →GAME SHUTDOWN →SYSTEM SUSPEND →SYSTEM SHUTDOWN |
| | PVR | PVR LOW-SPEED MODE →PVR SUSPEND→PVR SHUTDOWN → SYSTEM SUSPEND →SYSTEM SHUTDOWN |
| | GAME&PVR | PVR SUSPEND→ PVR SHUTDOWN →GAME SILENT MODE →GAME LOW-RESOLUTION MODE → GAME SUSPEND →GAME SHUTDOWN →SYSTEM SUSPEND →SYSTEM SHUTDOWN |
| GRAPHIC PROCESSOR | GAME | GAME LOW-RESOLUTION MODE→GAME SUSPEND→GAME SHUTDOWN→SYSTEM SUSPEND →SYSTEM SHUTDOWN |
| | PVR | SYSTEM SUSPEND → SYSTEM SHUTDOWN |
| | GAME&PVR | GAME LOW-RESOLUTION MODE→GAME SUSPEND→GAME SHUTDOWN→ SYSTEM SUSPEND →SYSTEM SHUTDOWN |
| MAIN PROCESSOR & GRAPHIC PROCESSOR | GAME | GAME SILENT &GAME LOW-RESOLUTION MODE→GAME SUSPEND → GAME SHUTDOWN →SYSTEM SUSPEND →SYSTEM SHUTDOWN |
| | PVR | PVR SUSPEND→ PVR SHUTDOWN →SYSTEM SUSPEND →SYSTEM SHUTDOWN |
| | GAME&PVR | ⎡ PVR SHUTDOWN<br>⎣ GAME LOW-RESOLUTION MODE →GAME SUSPEND→ GAME SHUTDOWN →SYSTEM SUSPEND →SYSTEM SHUTDOWN |

METHOD AND APPARATUS FOR CONTROLLING HEAT GENERATION

TECHNICAL FIELD

The present invention relates to a technique for controlling heat generation, and particularly to a method and an apparatus for controlling heat generation of hardware in a computer system.

BACKGROUND ART

When a chip or other hardware reaches a high temperature, it may operate erroneously, so that long-term reliability thereof decreases. Accordingly, computer systems are provided with various measures against the heat generation of hardware. For example, there are used methods for releasing heat generated by chips, such as providing a heatsink on a chip or providing a fan around a chip.

Meanwhile, computer applications are becoming more complicated, requiring high-speed processing systems. Particularly, a real-time application requires a processing speed of thousands of megabits per second. Such demands have enhanced the performance of hardware including microprocessors. Such hardware, however, generates greater heat to exhibit higher performance, so that heatsinks or fans may not handle the heat in some cases.

In such cases, the temperature inside the devices rises, which may cause some trouble such as malfunctions, hang-ups or abnormal termination of systems. Each time such trouble occurs, the user must restart the system or make other operation for system return. Such trouble may damage the reputation of products, particularly that of devices of which continuous use is required to satisfy the users, such as game devices.

SUMMARY OF THE INVENTION

Problem to be Solved by the Invention

The present invention has been made in view of such a situation, and a general purpose thereof is to provide a technique for efficient control of heat generated by hardware in a computer system.

One embodiment of the present invention relates to a method for controlling heat generation in a target part, in which the state of heat generation is to be controlled, in hardware of a computer system. In this method, the state of heat generation in a target part is acquired, and, based thereon, the state of heat generation in the target part is controlled by changing the operation of a running application so as to change the state of heat generation.

It should be appreciated that implementations of the invention in the form of apparatuses, systems, programs, or recording media storing programs may also be practiced as additional modes of the present invention.

The present invention is advantageous in controlling heat generation of hardware in a computer system.

BRIEF DESCRIPTION OF THE DRAWINGS

FIG. 1 is a diagram that shows an example of a control method list;

FIG. 4 is a diagram that shows an example of a reaction table that defines control methods;

EXPLANATION OF REFERENCE NUMERALS

Figure 2:
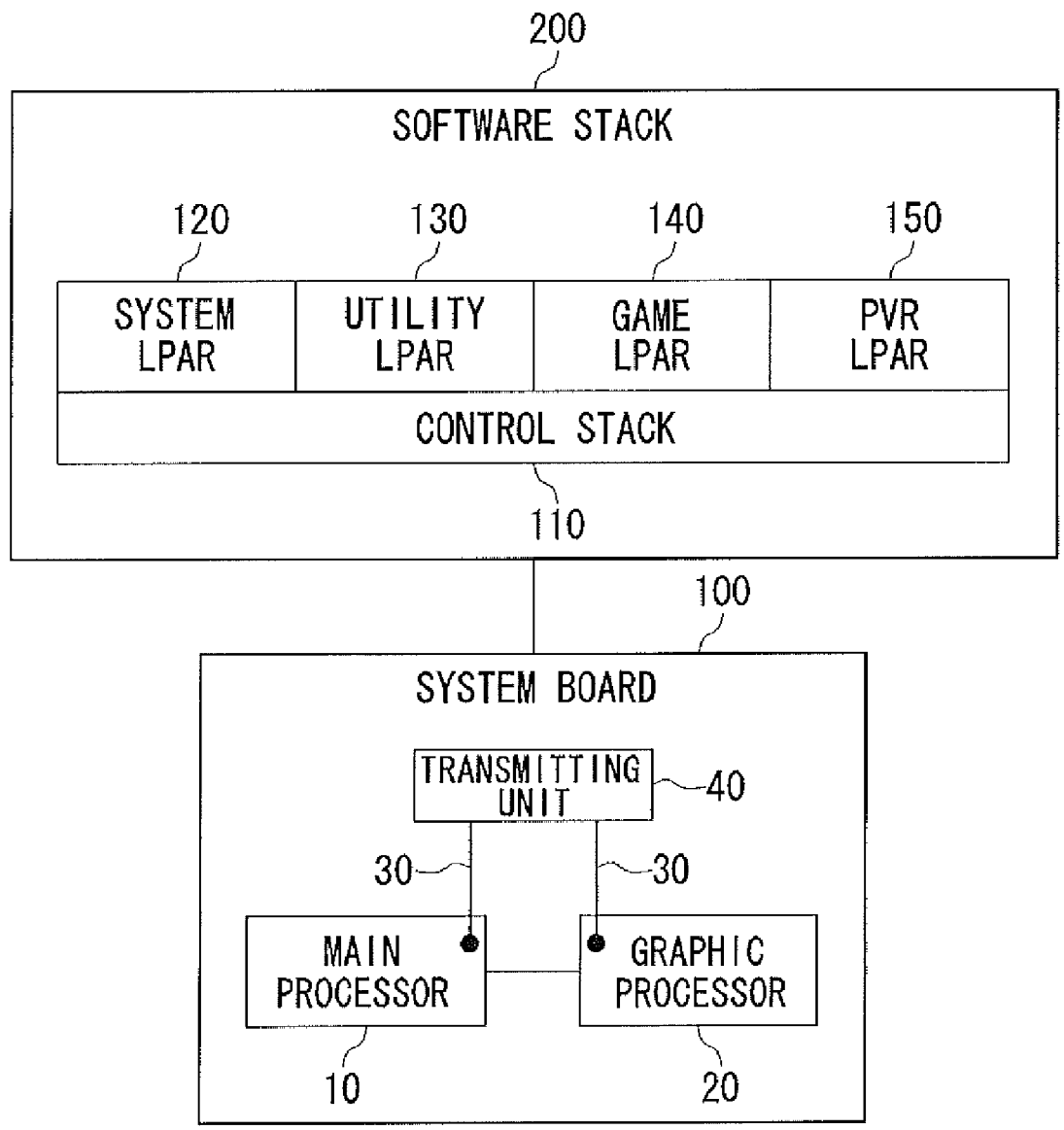
FIG. 2 is a diagram that shows a computer system according to an embodiment of the present invention.

10 main processor
20 graphic processor
30 temperature sensor
40 transmitting unit
100 system board
110 control stack
120 system LPAR
130 utility LPAR
140 game LPAR
150 PVR LPAR
200 software stack

DETAILED DESCRIPTION OF THE INVENTION

In the case where trouble, such as a malfunction, a hang-up or abnormal termination of a computer system, is caused by temperature rise inside a device with a computer system, there can be considered a workaround of enhancing the performance of a cooling mechanism, such as increasing the number of fins of a heatsink or powering up a cooling fan, so as to prevent the temperature rise.

Considering a game device as an example here, a manufacturer of a game device generally differs from that of an application executed by the game device, i.e. game software. Accordingly, when game software runs on a game device, the amount of heat generated by hardware in the game device varies depending on the specification of hardware required by the game software.

Also, as a trend in recent years, which will also continue into the future, a game device not only has a function of executing game software but also has functions as other devices, such as a home server for storing and delivering contents, a player of multimedia data recorded in recording media including DVDs (Digital Versatile Disks) and BDs (Blu-ray Discs), a PVR (Personal Video Recorder) and a network router. In such multifunctional game devices, the amount of heat generated by hardware differs depending on the type of the function in use or the number of functions performed concurrently.

Thus, the amount of heat generated within a game device in operation varies depending on the operating conditions thereof, such as the specification of game software executed or the number of functions performed concurrently. For the sake of safety, each manufacturer of game devices usually designs a cooling mechanism of a game device providing a safety margin for its cooling performance.

In such case, however, there arises a problem in that the size of the game device or power consumption increases. Also, since the heat generation of hardware in a game device is not so great in actual use as to cause trouble in the system, the performance of a cooling mechanism usually seems too large for the actual amount of heat generation.

Such a problem may occur not only in a game device but also in any device employing a computer system.

In order to control heat generation of hardware in a computer system efficiently, the inventors propose the following technique.

In this technique, the state of heat generation in a target part, of which heat generation is to be controlled, in hardware of a computer system is acquired. Then, based on the state of heat generation thus acquired, the state of heat generation in the target part is controlled by changing the operation of a running application so as to change the state of heat generation.

In the above description, "changing the operation of an application" means directly controlling the application to change the operation thereof so that the performance of hardware required by the application changes, which may also change the state of heat generation in the target part. Such changing includes, for example, changing the operation mode of a running application from the normal mode to the low-speed mode, which requires lower processing speed than the normal mode, or, while keeping the main function of the application in the normal mode, changing the processing modes of the other functions to the low-speed mode. Stopping a running application is also included in the "changing".

Also, based on the state of heat generation acquired, adjustment may be made to the operation of a part included in the hardware of the system, of which operational state affects the state of heat generation in the target part.

The "adjustment" stated above means to directly adjust the operation of such part, and it includes, for example, adjusting the operating frequency of a processor or adjusting the number of revolutions of a fan.

Accordingly, such adjustment to the operation of hardware may be made together with the change to the operation of an application, so as to control the state of heat generation in a target part.

In addition, there may be retained a control method list, which defines a control method with respect to each state of heat generation that a target part could exhibit. A control method corresponding to the state of heat generation in the target part may be acquired from the control method list, so as to control the state of heat generation in the target part according to the control method thus acquired.

The "control method" above means a method for changing the operation of an application, a method for adjusting hardware, or a combination thereof.

The control method list will now be described more specifically, using an example of a system that comprises a main processor and a graphic processor and is capable of performing a game function and a PVR function. In this system, the game function and PVR function are performed by a game LPAR and a PVR LPAR, respectively. An LPAR is a logical partition function for logically dividing system resources for use. The present specification uses "LPAR" with the same meaning as a stack of software that is executed on a partition divided logically, and software belonging to the same LPAR is considered as the same type.

FIG. 1 shows an example of the control method list for the case where the game LPAR of the two LPARs in the system is in operation. The level of the state of heat generation in the main processor or graphic processor is classified into nine levels from A to I in descending order of temperature, and control methods are defined for the respective levels.

For instance, for the case where the state of heat generation in the main processor reaches the level I, the list defines "restraint of main processor operation" as the control method "9". The "restraint of main processor operation" is direct adjustment to the operation of hardware, such as lowering the frequency of the main processor.

Also, for the case where the state of heat generation in the main processor reaches the level H, a higher level than the level I, "data protection and game LPAR suspend, display of warning message, and log recording" are defined as the control methods "8 & 11 & 12". The "data protection and game LPAR suspend" is a change to the operation of software, and in such control a time for saving data, for example, is given before the game LPAR is placed in the suspend mode.

For the case of the level G, a further higher level, "game LPAR suspend, display of warning message, and log recording" are defined as the control methods "7 & 11 & 12". While "data protection and game LPAR suspend" is defined in the level H, the suppression of heat generation is given a higher priority than data protection in the level G.

The highest level A indicates a critical situation, such as a state just before the main processor becomes unable to operate properly, and "system shutdown" is defined as the control method "1" for such state.

In the same way, a control method of the graphic processor is defined with respect to each level of the state of heat generation therein.

When multiple types of applications are running concurrently, such types may be acquired so as to change the operation of a running application according to the combination of the types thus acquired. For example, a priority may be assigned to each type of application, and the operation may be changed according to the priorities of running applications so that the operation of a type of application having a lower priority is restrained first.

Also, a priority may be assigned to each function provided by an application, and the operation of a running application may be changed so that the operation of a part of the application that provides a function with a lower priority is restrained first.

In one embodiment of the present invention, it is desirable that, when the state of heat generation in a target part falls outside a defined range of normal state, the operation is changed or adjusted so that the state of heat generation in the target part returns within the range of normal state. Then, when the state of heat generation returns within the range of normal state, return processing including canceling the change or undoing the adjustment should be performed.

In addition, when the state of heat generation in a target part falls outside the defined range of normal state, the user may be notified thereof. In this case, such notice should preferably be given only when the frequency of the state of heat generation falling outside the range of normal state exceeds a certain threshold.

In the following, an embodiment of the present invention will be specifically described with reference to the drawings.

FIG. 2 is a block diagram that shows a configuration of a computer system 500 according to an embodiment of the present invention. In the embodiment, the computer system 500 is used for a game device, which has a function as a PVR besides a game function.

The computer system 500 provides functions and environments for efficient use of the system, including an operating system (hereinafter, referred to as "OS") for providing overall control of the whole system. On the OS, multiple application software programs (hereinafter, referred to as "applications") are executed.

Each of the elements represented by functional blocks for performing various processes shown in FIG. 2 or other drawings can be implemented by a CPU, a memory, an LSI or the like in terms of hardware, and by a memory-loaded program providing a timer management function or the like in terms of software. Accordingly, it will be obvious to those skilled in the art that these functional blocks may be implemented in a variety of forms by hardware only, software only or a combination thereof, and the form is not limited to any of them.

The computer system 500 comprises a system board 100 and a software stack 200.

The system board 100 includes a main processor 10, a graphic processor 20 and a transmitting unit 40. The main processor 10 and graphic processor 20 cooperatively perform arithmetic processing. Within each chip of the main processor 10 and graphic processor 20, a temperature sensor 30 is provided. The transmitting unit 40, connected to the temperature sensors 30, transmits the temperatures of the main processor 10 and graphic processor 20 measured by the temperature sensors 30 to the software stack 200, more specifically to a control stack 110, which will be described later.

The software stack 200 includes the control stack 110, a system LPAR 120, a utility LPAR 130, a game LPAR 140 and a PVR LPAR 150.

The system LPAR 120 is an LPAR for providing the basic functions of the OS in the computer system 500. The utility LPAR 130 supports a display apparatus, not illustrated, or drivers of peripheral devices, etc. The game LPAR 140 and PVR LPAR 150 are application LPARs for performing the game function and the PVR function, respectively.

The control stack 110 controls the LPARs in the software stack 200, such as managing a schedule for each LPAR, and is also capable of controlling the operation of hardware in the computer system 500, i.e. each component included in the system board 100.

Figure 3:
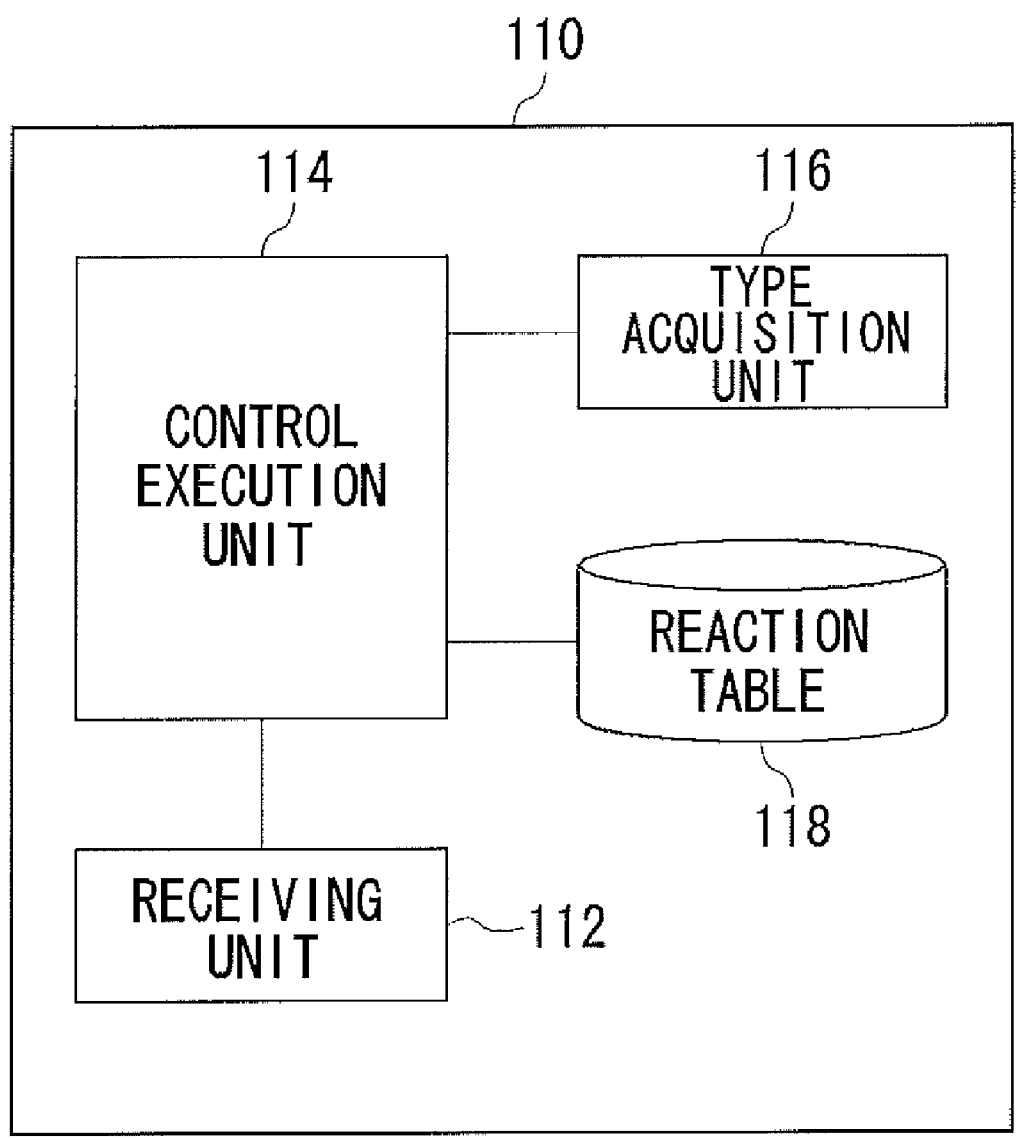
FIG. 3 is a diagram that shows a configuration of a control stack in the computer system shown in FIG. 2.

In the computer system 500, the state of heat generation in the system board 100, more specifically the state of heat generation in the main processor 10 and graphic processor 20, is controlled by the control stack 110. FIG. 3 shows a functional configuration of the control stack 110. In the interest of clarity of the present invention, FIG. 3 only shows functions relating to the control of heat generation in the system board 100 among various functions performed by the control stack 110, omitting the rest of the functions.

FIG. 3 illustrates the control stack 110. The control stack 110 includes a receiving unit 112, a control execution unit 114, a type acquisition unit 116 and a reaction table 118. The receiving unit 112 receives the temperatures of the main processor 10 and graphic processor 20 transmitted from the transmitting unit 40. The type acquisition unit 116 acquires the type of a running application. The control execution unit 114 performs control according to the temperatures received by the receiving unit 112 and the type of the running application acquired by the type acquisition unit 116.

The reaction table 118 is a list that defines methods for application control, which is one of the controls performed by the control execution unit 114. The control execution unit 114 acquires, from the reaction table 118, a control method corresponding to the temperature received by the receiving unit 112 and the type of the running application acquired by the type acquisition unit 116, and performs application control using the control method thus acquired.

The operation of the control execution unit 114 will now be described more specifically with reference to FIGS. 4-7.

FIG. 4 shows a specific example of the reaction table 118. The reaction table 118 may be of any form as long as the control execution unit 114 can refer to it, and the table is provided as a library, for example, in the embodiment.

Figure 5:
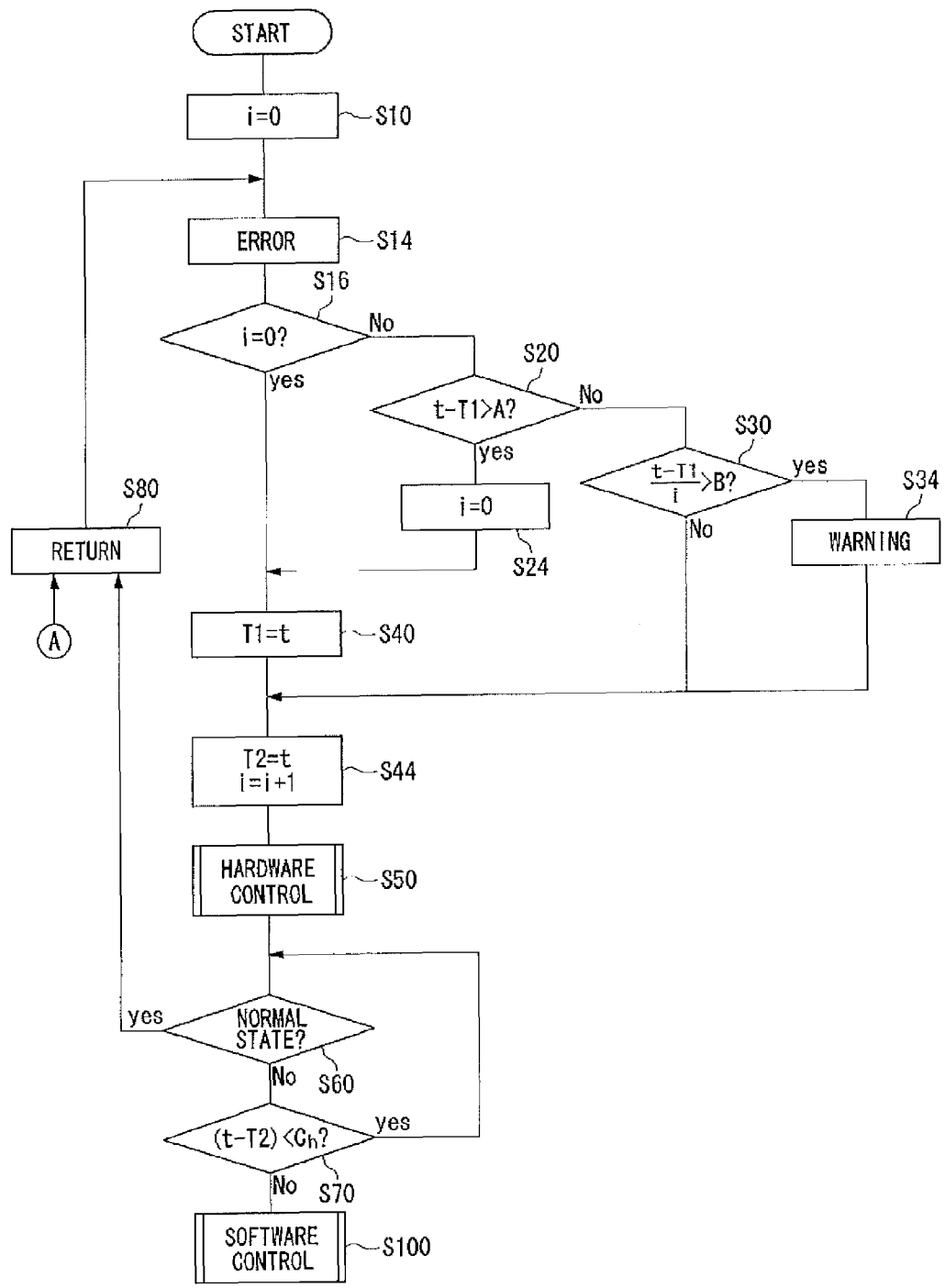
FIG. 5 is a flowchart that shows processing performed by a control execution unit in the control stack shown in FIG. 3.
Figure 6:
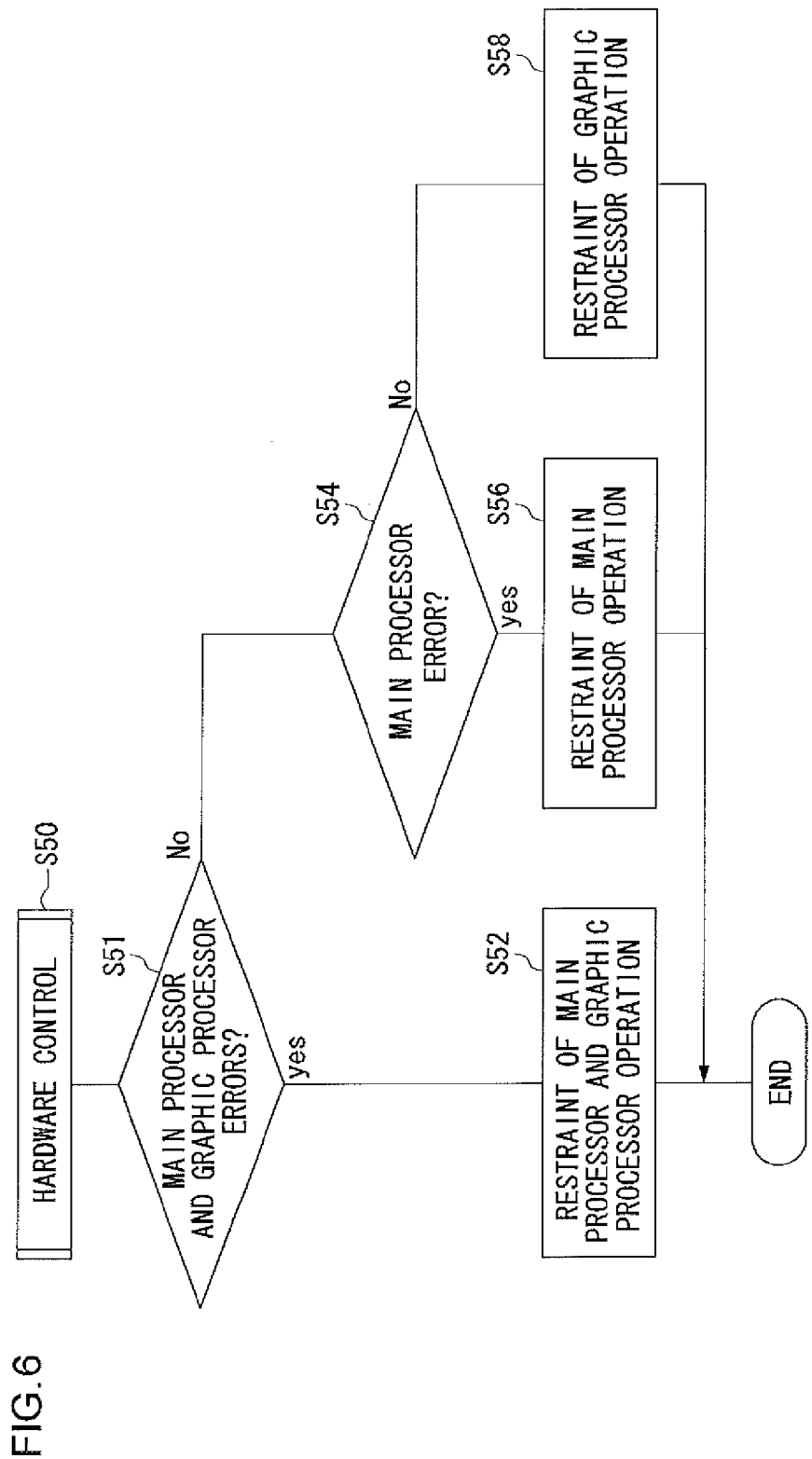
FIG. 6 is a flowchart that shows hardware control processing for adjusting the operation of hardware.
Figure 7:
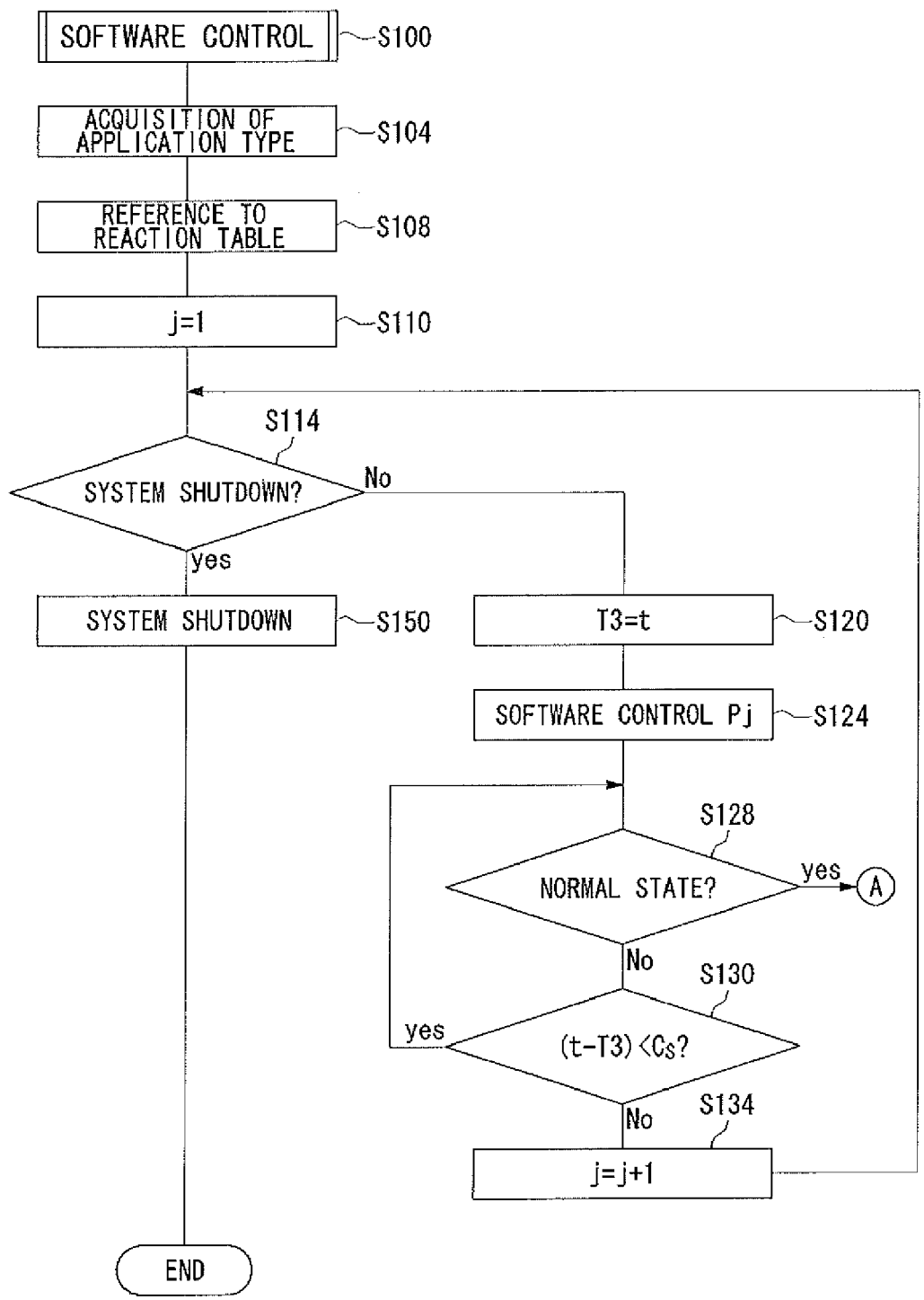
FIG. 7 is a flowchart that shows software control processing for changing the operation of an application.

FIGS. 5-7 are flowcharts that show processing performed by the control execution unit 114. The control execution unit 114 counts the number of thermal errors that have occurred, i, in performing control, in which the default value of the number i is set to zero (S10).

When the temperature of either the main processor 10 or graphic processor 20 exceeds a predetermined threshold, the control execution unit 114 determines that a thermal error has occurred and starts control (S14). When a thermal error occurs, the control execution unit 114 first checks the number of error occurrences i (S16). If the number i is zero (Yes at S16), the control execution unit 114 will set a warning reference time T1 and a hardware control reference time T2 (both will be detailed later) to the current time t, and will add one to the number of thermal error occurrences i (S40 and S44). The control execution unit 114 then performs hardware control processing (S50).

FIG. 6 is a flowchart that shows the hardware control processing performed at the step S50. The hardware control processing that the control execution unit 114 performs is processing for directly adjusting the operation of a part included in the hardware of the computer system 500 that affects the state of heat generation in a target part, of which heat generation is to be controlled. In the embodiment, the target parts are the main processor 10 and graphic processor 20, and the parts to be adjusted by the control execution unit 114 are set to the target parts themselves.

In the hardware control processing, the control execution unit 114 first checks the processor of which the temperature has exceeded a threshold (S51 and S54) If the temperatures of both the main processor 10 and graphic processor 20 have exceeded the threshold (Yes at S51), the control execution unit 114 will restrain the operation of both the processors by lowering power consumption therein, using a method for reducing the operating frequencies of processors, such as clock gating (S52). The methods for restraining the operation of the main processor 10 and graphic processor 20 may be the same, or may be different so that each method matches the architecture of the respective processors.

If the temperature of the main processor 10 alone has exceeded the threshold (No at S51 and Yes at S54), the control execution unit 114 will only restrain the operation of the main processor 10 (S56).

If, on the other hand, the temperature of the graphic processor 20 alone has exceeded the threshold (No at S51 and No at S54), the control execution unit 114 will only restrain the operation of the graphic processor 20 (S58). In this case, since the operation of the main processor 10 is considered to be affecting the heat generation of the graphic processor 20, the operation of the main processor 10 may be also restrained besides that of the graphic processor 20.

If the temperature of the target part becomes the threshold or less again within a predetermined limited time Ch from the time when the adjustment started, i.e. the hardware control reference time T2 (Yes at S70 and Yes at S60), the control execution unit 114 will perform return processing (S80) and stand by for the next error. The return processing here means processing for undoing the operation of the target part adjusted at the step S50, such as restoring the operating frequencies of processors to the ones originally set.

If the temperature of the target part does not become the threshold or less even when the limited time Ch has elapsed from the time when the adjustment started (No at S60 and No at S70), the control execution unit 114 will perform software control processing (S100).

Referring back to the step S16, if the number of error occurrences is not zero (No at S16), the control execution unit 114 will check the time (t-T1), the time that elapsed from the warning reference time T1, which is set at the step S40, until the subject error has occurred (S20). If the time (t-T1) exceeds a predetermined threshold A (Yes at S20), the control execution unit 114 will reset the number of error occurrences i to zero and will set the warning reference time T1 to the time when the subject error occurred, t, (S24 and S40) to perform the processing from the step S44. If, on the other hand, the time (t-T1) is the threshold A or less (No at S20), the control execution unit 114 will compute the frequency of errors that occurred within the time, and will check if the computed frequency exceeds a threshold B (S30).

If the frequency of error occurrences exceeds the threshold B (Yes at S30), the control execution unit 114 will issue a warning to indicate that errors occur frequently, using the speaker or display apparatus of the game device in which the computer system 500 is provided (S34), before performing the processing from the step S44. If the frequency of error occurrences is the threshold B or less (No at S30), on the other hand, the control execution unit 114 will perform the processing from the step S44.

Since it has been already described, the explanation of the processing from the step S44 is omitted here.

FIG. 7 is a flowchart that shows the software control processing performed at the step S100 in the flowchart of FIG. 5. As stated previously, the control execution unit 114 performs software control processing when the temperature of the target part does not become the threshold or less within the limited time Ch. The software control processing is performed with reference to the reaction table 118 shown in FIG. 4.

The reaction table 118 is a list that defines step-by-step control methods (reaction in FIG. 4) with respect to each combination of the processor in which a thermal error occurs and the type of the running application. In the following, the reaction table 118 and software control processing will be described in detail, assuming the case as an example where a thermal error has occurred only in the main processor 10 and the type of the application currently running is "game".

In the software control processing (S100), as shown in FIG. 7, the control execution unit 114 first allows the type acquisition unit 116 to acquire the type of the running application LPAR (S104). In the example mentioned above, the type of the running application LPAR is the game LPAR 140.

Based on the processor having the thermal error and the type of the running application LPAR, the control execution unit 114 acquires a control method corresponding thereto from the reaction table 118 (S108). As shown in the top column in FIG. 4, the control methods for this case are sequentially defined step by step as "silent mode", "silent & low-resolution mode", "game suspend", "game shutdown", "system suspend" and "system shutdown". The control execution unit 114 performs control in this order accordingly.

In this case, since the running application is only a game, the application causing the thermal error in the main processor 10 can be determined as the game. Accordingly, the control methods are defined so as to restrain the operation of the game LPAR 140. In the present embodiment, the image rendering function has a higher priority than the audio function for game applications. Accordingly, the reaction table 118 defines in the corresponding column therein the control method of "silent mode" as the first step for restraining the operation of a game application, so as to restrain the audio function having a lower priority first.

The control execution unit 114 sets a software control reference time T3 to the current time, and stops the audio function for the game application in accordance with the control method of "silent mode" defined as the first step (S110, No at S114, S120 and S124). Then, if the temperature of the target part, i.e. the main processor 10 in this example, becomes the threshold or less again within a predetermined limited time Cs from the time when the audio function is stopped, i.e. the software control reference time T3 (Yes at S130 and Yes at S128), the control execution unit 114 will perform return processing (S80 in FIG. 5) and stand by for the next error. The return processing in the software control processing is processing for canceling the change provided in the step S124, so that in this case it means processing for restoring the audio function for the game application.

If the temperature of the main processor 10 does not become the threshold or less even when the limited time Cs has elapsed from the software control reference time T3 set at the step S120 (No at S128 and No at S130), the control execution unit 114 will perform the processing from S120 in accordance with the next step of control method, while continuously providing the control already applied. In this example, the control method of "low-resolution mode" is defined as the second step, so that the image rendering mode for the game application is set to the low-resolution mode while the silent mode is continued.

In this manner, the control execution unit 114 sequentially employs multiple control methods as defined. If the control provided by a control method succeeds in lowering the temperature of the target part to the threshold or less within the predetermined limited time Cs, the control execution unit 114 will perform return processing and terminate the software control processing. If the control provided by a control method fails to lower the temperature of the target part to the threshold or less within the predetermined limited time Cs, the control execution unit 114 will continuously perform control adding the next control method.

If the next control method is the "system shutdown" defined as the last step (Yes at S114), the control execution unit 114 will shut down the computer system 500 entirely (S150).

In the top column in the reaction table 118, the control methods of "game suspend", "game shutdown", "system suspend" and "system shutdown" are defined as the third, fourth, fifth and sixth steps, and the control operations corresponding thereto are "placing the game LPAR 140 in the suspend mode", "shutting down the game LPAR 140", "placing the whole system in the suspend mode" and "shutting down the whole system", respectively.

When placing an application LPAR or the whole system in the suspend mode, the control execution unit 114 in the computer system 500 of the present embodiment secures a time for saving data, so as to save the data before enabling the suspend mode.

Similarly, when shutting down an application LPAR or the whole system, the control execution unit 114 secures a time for saving data, so as to save the data before executing the shutdown.

The software control processing has been specifically described above, considering the case as an example where a thermal error has occurred only in the main processor 10 and the type of the application currently running is "game". In the following, the software control processing in other cases will be described by detailing the control methods defined in the columns other than the top column in the reaction table 118.

For the case where a thermal error has occurred only in the main processor 10 and the type of the application currently running is "PVR", five steps of control methods are sequentially defined in the reaction table 118 as "PVR low-speed mode", "PVR suspend", "PVR shutdown", "system suspend" and "system shutdown". The "PVR low-speed mode", "PVR suspend" and "PVR shutdown" correspond to the control operations of "placing the recording mode in the low-speed mode", "placing the PVR LPAR 150 in the suspend mode" and "shutting down the PVR LPAR 150", respectively.

Also, for the case where a thermal error has occurred only in the main processor 10 and the types of the applications currently running are "game" and "PVR", eight steps of control methods are sequentially defined as "PVR suspend", "PVR shutdown", "game silent mode", "low-resolution mode", "game suspend", "game shutdown", "system suspend" and "system shutdown". Since the computer system 500 of the present embodiment is employed for a game device, "game" has a higher priority than "PVR". Accordingly, for the case where a thermal error has occurred, the restraint of the PVR LPAR 150 ("PVR suspend" and "PVR shutdown") is set to be performed in advance of the restraint of the game LPAR ("game silent mode", "low-resolution mode", "game suspend" and "game shutdown"), so as to restrain the operation of the type of application having the lower priority first.

Alternatively, for the case where a thermal error has occurred while multiple types of applications are running, the operation of the application having the lowest priority may be restrained by using the same steps of control methods as defined for the case where a thermal error has occurred while only that application is running. For example, for the case where a thermal error has occurred only in the main processor 10 and the type of the application currently running is "PVR", the control methods are sequentially defined as "PVR low-speed mode", "PVR suspend" and "PVR shutdown". Accordingly, when a thermal error has occurred only in the main processor 10 and the types of the applications currently running are "game" and "PVR", such control methods of "PVR low-speed mode", "PVR suspend" and "PVR shutdown" may be used in this order to restrain the PVR, which should be restrained first. In the present embodiment, on the other hand, the first step of the control methods for controlling the PVR in such case is not the "PVR low-speed mode", but is defined as the "PVR suspend", which can reduce the load on the processor more significantly than the "PVR low-speed mode". This enables prompt elimination of the influence caused on an application with a higher priority.

For the case where a thermal error has occurred only in the graphic processor 20 and the type of the application currently running is "game", five steps of control methods are sequentially defined in the reaction table 118 as "low-resolution mode", "game suspend", "game shutdown", "system suspend" and "system shutdown". The control method of "silent mode" is not included therein, because the graphic processor 20 is a processor for handling processing related to rendering, so that the audio function for games has virtually no influence on the state of heat generation in the graphic processor 20.

For the case where a thermal error has occurred only in the graphic processor 20 and the type of the application currently running is "PVR", two steps of control methods are sequentially defined as "system suspend" and "system shutdown". In this case, the control method of "system suspend" is defined as the first step, leaving the restraint of the PVR LPAR or the like aside. This is because, since the PVR LPAR 150 scarcely uses the graphic processor 20, the thermal error caused in the graphic processor 20 in such case is attributable to some problem in the operating conditions or trouble affecting the whole system.

For the case where a thermal error has occurred only in the graphic processor 20 and the types of the applications currently running are "game" and "PVR", five steps of control methods are sequentially defined as "game low-resolution mode", "game suspend", "game shutdown", "system suspend" and "system shutdown", which are the same as the control methods for the case where the type of the application currently running is only "game".

Next, a case will be described where thermal errors have occurred in both the main processor 10 and graphic processor 20.

For the case where the type of the application currently running is "game" in such occasion, five control methods are sequentially defined as "silent & low-resolution mode", "game suspend", "game shutdown", "system suspend" and "system shutdown". The first step therein is not the "silent mode" but is defined as the "silent & low-resolution mode", because, since thermal errors have occurred in both the main processor 10 and graphic processor 20, the errors cannot be resolved sufficiently fast only with the control method of "silent mode".

For the case where the type of the application currently running is "PVR" in such occasion, on the other hand, four control methods are sequentially defined as "PVR suspend", "PVR shutdown", "system suspend" and "system shutdown". When a thermal error has occurred in the graphic processor 20 while there is only operated the PVR, which scarcely uses the graphic processor 20, it is highly possible that there is some problem in the operating conditions or trouble affecting the whole system. Accordingly, the first step of the control methods in such case is not the "PVR low-speed mode" but is defined as the "PVR suspend", so as to reduce the number of control steps for the PVR LPAR 150. Also, by providing the "PVR suspend" as the first step, data will be saved therein, so that the data can be securely protected even if there is some problem affecting the whole system.

Lastly, for the case where the types of the applications currently running are "game" and "PVR" in such occasion, six control methods are sequentially defined as "PVR shutdown, game low-resolution mode", "game suspend", "game shutdown", "system suspend" and "system shutdown". These six control methods are defined for the case where thermal errors are occurring concurrently in the main processor 10 and graphic processor 20; if either of the thermal errors in the main processor 10 and graphic processor 20 is resolved during the control provided by one of the control methods above, the control execution unit 114 will thereafter provide control according to the control methods defined for the case where a thermal error has occurred only in the processor that has not have its thermal error resolved yet. For example, if the temperature of the main processor 10 becomes the threshold or less within the limited time Cs while control is provided according to the control methods of "PVR shutdown, game low-resolution mode" defined as the first step, the control execution unit 114 will thereafter provide control according to the "game suspend"—the control method that follows the "low-resolution mode" in the control methods defined for the case where "a thermal error has occurred only in the graphic processor and the application currently running is 'game' ".

Thus, the computer system 500 shown in FIG. 2 measures the temperatures of the main processor 10 and graphic processor 20, of which heat generation is to be controlled, and transmits the temperatures to the control stack 110; the control stack 110 then controls the temperatures of such processors to be controlled, by changing the operation of an application according to the measured temperatures. This enables reliable temperature control, without providing a high-power cooling device in the system.

Also, a higher priority is assigned to the image rendering function than the audio function in the game functions, and the function with the lower priority is set to be restrained first. Accordingly, the function with the higher priority can be continuously performed with temperature control provided, causing less stress to the user.

Similarly, priorities are provided to application LPARs, and the operation of an LPAR having a lower priority is set to be restrained first. Accordingly, the essential function in the system, i.e. an application with a higher priority, can be continuously performed with temperature control provided.

In addition, by providing the adjustment to the operation of hardware, such as reducing the operating frequency of the main processor or graphic processor, together with the control stated above, temperature control can be provided more efficiently.

Since there is provided the reaction table 118 that defines control methods with respect to each state of heat generation that the system could exhibit, the control execution unit 114 can easily control even a system with complicated configuration with reference to the table.

Also, since the user is notified of the occurrence of a thermal error, the user can securely check if there is a problem in the operating conditions accordingly. Such notice is provided only when the frequency of the occurrences of thermal errors exceeds a certain threshold, assuming that thermal errors are not likely to occur frequently under normal use, so that the user can be notified of the possibility of a problem in the operating conditions or the like without being annoyed by frequent notification.

Further, when an LPAR or the system is placed in the suspend mode or is shut down, the data is securely saved during a time given therefor.

The present invention has been described with reference to the embodiment. The embodiment is intended to be illustrative only and it will be obvious to those skilled in the art that various modifications to constituting elements or processes could be developed and that such modifications also fall within the scope of the present invention.

For instance, although the computer system 500 shown in FIG. 2 is considered to be a system used for a game device in the embodiment, the technique for controlling heat generation of the present invention is also applicable to any devices employing computer systems, besides game devices.

Also, although the types of applications are defined as the "game" and "PVR" in the computer system 500 shown in FIG. 2, the number of the types of applications is not limited to two and may also be thereabove or therebelow.

The history of thermal error occurrences may be recorded as a log. In such case, it is desirable to also record the part where the thermal error has occurred, the type of the application currently running, etc. Based on such log, the cause of heat generation in the system can be analyzed later in detail and the result may be used for the improvement in designing.

The occurrence of a thermal error may be conveyed to a management apparatus connected with the subject device via a network, for example, so that a manager at a remote location can comprehend the condition.

The change to the operation of software or the adjustment to the operation of hardware is also not limited to that according to the methods described above.

Also, the content of the control method list, i.e. the reaction table 118, may not necessarily be fixed. For example, if thermal errors occur frequently while a game application is running, the control method list may be changed so as to restrain the operation more strictly, such as using two steps of control methods concurrently, when a thermal error occurs while a game application is running.

Further, in the computer system 500 shown in FIG. 2, objects to be controlled are defined as the main processor 10 and graphic processor 20, and the internal temperatures of the processors are considered as the state of heat generation therein. However, temperature sensors may also be provided, for example, on the surfaces of the processors or other areas on the system board 100, so as to take the average temperature of each sensor into account in considering the state of heat generation.

In such case, the state of heat generation should desirably be controlled so as to lower the average temperatures and keep the temperatures at certain points in the measurement areas under the threshold. This can prevent local temperature rise, i.e. hot spot, in hardware.

INDUSTRIAL APPLICABILITY

As is discussed above, the present invention is available for electronic devices including computers, cellular phones and game devices.

The invention claimed is:

1. A method for controlling heat generation, comprising:
acquiring a temperature in a target part, of which heat generation is to be controlled, in hardware of a computer system;
acquiring a type of a running application software, the type being determined by a content of the application; and
controlling the temperature in the target part by directly providing predetermined control that adjusts a hardware capability which affects the temperature in the target part and when a predetermined time elapses after the temperature detected by a heat detection unit falls outside a defined range of normal temperature and prior to the temperature returning to the range of normal temperature, commencing a change to an operation of the application software even though the hardware capability was adjusted, such that the change provided to the application software changes the operation of the application software step by step in an order according to a combination of the temperature and the type acquired,
wherein the order of the operation to be changed is predetermined according to a combination of types of application software running simultaneously, such that the order of the change to the application software is changed depending on the types of application software running simultaneously.

2. The method for controlling heat generation according to claim 1, comprising:
retaining a control method list which defines a control method with respect to each temperature range that the target part could exhibit; and
acquiring, from the control method list, a control method corresponding to the temperature acquired, and performing the controlling according to the control method thus acquired.

3. An apparatus for controlling heat generation, comprising:
a heat detection unit which acquires a temperature in a target part, of which temperature is to be controlled, in hardware of a computer system;
an application type acquisition unit which acquires a type of a running application software, the type being determined by a content of the application software; and
a control unit which controls the temperature in the target part by directly providing predetermined control to one or more of a hardware capability or the application software to change an operation of the application software step by step in an order according to a combination of the temperature acquired by the heat detection unit and the type acquired by the application type acquisition unit,
wherein the control unit initially provides an adjustment of the hardware capability which affects the temperature in the target part, and when a predetermined time elapses after the temperature detected by a heat detection unit falls outside a defined range of normal temperature and before the temperature returns to the range of normal temperature, the control unit begins providing the change of the operation of the application software even though the hardware capability was adjusted, the order of the operation to be changed by the control unit is predetermined according to a combination of types of application software running simultaneously, such that the order of the change to the application software is changed depending on the types of application software running simultaneously.

4. The apparatus for controlling heat generation according to claim 3, comprising a control method list retaining unit which retains a control method list which defines a control method with respect to different temperatures that the target part could exhibit, wherein the control unit acquires, from the control method list, a control method corresponding to the temperature acquired by the heat detection unit, and performs the controlling according to the control method thus acquired.

5. The apparatus for controlling heat generation according to claim 3, in which a priority is defined with respect to each type of application, wherein, according to the priorities of the types of running applications, the control unit provides the change so as to restrain the operation of a type of application with a lower priority first.

6. The apparatus for controlling heat generation according to claim 3, in which a priority is defined with respect to each function provided by an application, wherein the control unit provides the change so as to restrain the operation of a part of a running application that provides a function with a lower priority first.

7. The apparatus for controlling heat generation according to claim 3, comprising a notification unit which, when the temperature detected by the heat detection unit falls outside a defined range of normal state, provides notice to a user.

8. The apparatus for controlling heat generation according to claim 7, wherein the notification unit provides the notice when the frequency of the temperature falling outside the range exceeds a predetermined threshold.

9. The apparatus for controlling heat generation according to claim 3, wherein the change of the operation of the application software is a transition into a low-resolution mode such that an image resolution is lowered in a rendering process.

10. The apparatus for controlling heat generation according to claim 3, wherein the change of the operation of the application software is a transition into a low-speed mode such that a processing speed of the application software is lowered.

11. The apparatus for controlling heat generation according to claim 3, wherein the change of the operation of the application software is data protection and application suspend such that the data is saved and the application is placed in the suspend mode.

12. The appartus for controlling heat generation according to claim 3, wherein the order of the operation to be changed by the control unit is changed depending on frequency of the temperature falling outside the range of normal temperature.

13. The method for controlling heat generation according to claim 2, further comprising dynamically modifying contents of the control method list based on a frequency of occurrence of thermal errors.

14. The method for controlling heat generation according to claim 13, wherein the contents of the control method list are changed such that at least two methods listed in the control method list are employed concurrently to control heat generated in the target part when thermal errors occur frequently during execution of the application software.

* * * * *